United States Patent [19]
Hart

[11] Patent Number: 5,271,841
[45] Date of Patent: Dec. 21, 1993

[54] METHOD FOR REMOVING BENZENE FROM EFFLUENT WASH WATER IN A TWO STAGE CRUDE OIL DESALTING PROCESS

[75] Inventor: Paul R. Hart, The Woodlands, Tex.
[73] Assignee: Betz Laboratories, Inc., Trevose, Pa.
[21] Appl. No.: 934,834
[22] Filed: Aug. 24, 1992
[51] Int. Cl.$^5$ .................. B01D 11/04; C10G 31/08
[52] U.S. Cl. .................. 210/634; 210/708; 208/177; 208/311; 208/339; 208/251 R
[58] Field of Search .................. 210/634, 708; 208/177, 208/311, 339, 251 R

[56] References Cited

U.S. PATENT DOCUMENTS

| | | | |
|---|---|---|---|
| 3,322,664 | 5/1967 | Paterson et al. | 208/251 R |
| 4,339,330 | 7/1982 | Fujwara et al. | 208/251 R |
| 4,415,434 | 11/1983 | Hargreaves et al. | 208/251 R |
| 4,556,480 | 12/1985 | Cawi et al. | 208/251 R |
| 4,645,512 | 2/1987 | Johns | 208/251 R |
| 4,806,231 | 2/1989 | Chirinos et al. | 208/251 R |

Primary Examiner—Neil M. McCarthy
Attorney, Agent, or Firm—Alexander D. Ricci; Steven D. Boyd

[57] ABSTRACT

Methods of diminishing the benzene content of the effluent wash water in a two stage crude oil desalting system are disclosed. The first stage desalter is operated at "low", near ambient temperatures with decreased mixing of crude oil and wash water and increased addition of demulsifier. The second stage is operated at "hot" temperatures of prior processes with increased mixing of the crude oil and wash water. The effluent wash water has a substantially diminished benzene content compared to prior two-stage desalting systems.

2 Claims, 2 Drawing Sheets

METHOD FOR REMOVING BENZENE FROM EFFLUENT WASH WATER IN A TWO STAGE CRUDE OIL DESALTING PROCESS

FIELD OF THE INVENTION

The present invention relates to methods for removing benzene from the wash water in a crude oil desalting system. More particularly, the present invention provides methods to reduce the benzene concentration in the effluent brine in a two stage crude oil desalting system.

BACKGROUND OF THE INVENTION

All crude oil contains impurities which contribute to corrosion, heat exchanger fouling, furnace coking, catalyst deactivation and product degradation in refining and other processes. These contaminants are broadly classified as salts, bottom sediment and water, solids, and metals. The amounts of these impurities vary depending upon the particular crude. Generally, crude oil salt content ranges between about 3 and 200 pounds per 1000 barrels.

Brines present in crude include predominently sodium chloride with lesser amounts of magnesium chloride and calcium chloride being present. Chloride salts are the source of highly corrosive HCL, which is severely damaging to refinery tower trays and other equipment. Additionally, the carbonate and sulfate salts may be present in the crude in sufficient quantities to promote crude preheat exchanger scaling.

Solids other than salts are equally harmful. For example sand, clay, volcanic ash, drilling mud, rust, iron sulfite, metal and scale may be present and can cause fouling, plugging, abrasion, erosion and residual product contamination. As a contributor to waste and pollution, sediment stabilizes emulsions in the form of oil wetted solids, and can carry significant quantities of oil into the waste recovery system. Organic materials such as benzene may be transferred to the wash water stream causing wastewater discharge problems. Current and proposed limitations on refinery wastewater discharge exists. Specific limitations on benzene content are particularly relevant to desalter operations since desalter effluent brine has been identified as a major source (60 to 80%) of benzene in refinery wastewater.

Desalting is, as the name implies, adapted to remove primarily inorganic salts from the crude prior to refining. The desalting step is provided by adding and mixing with the crude a few volume percentages of fresh water to contact the brine and salts.

In crude oil desalting, a water-in-oil emulsion is intentionally formed with the water admitted being on the order of about 4 to 40 volume percent based on the crude oil. Water is added to the crude and mixed intimately to transfer impurities in the crude to the water phase. Separation of the phases occurs due to coalescence of the small water droplets into progressively larger droplets and eventual gravity separation of the oil and underlying water phase.

Demulsification agents are added, usually upstream from the desalter to help in providing maximum mixing of the oil and water phases in the desalter. Known demulsifying agents include water soluble salts, Twitchell reagents, sulfonated glycerides, sulfonated oils, acetylated castor oils, ethoxylated phenolformaldehyde resins, a variety of polyester materials, and many other commercially available compounds. In addition to demulsifiers, other materials may be fed to the crude. For example, U.S. Pat. No. 5,080,779 discloses the addition of water soluble chelants to control iron.

Desalters are also commonly provided with electrodes to impart an electric field in the desalter. This serves to polarize the dispersed water droplets. The so formed dipole droplets exert an attractive force between oppositely charged poles with the increased attractive force increasing the speed of water droplet coalescence to from 10 to 100 fold. The water droplets also move quickly in the electrical field, thus promoting random collisions that further enhance coalescence.

Upon separation of the phases from the water-in-oil emulsion, the crude is commonly drawn off the top of the desalter and sent to the fractionator tower in crude units or other refinery processes. The water phase containing water soluble metal salt compounds, other contaminants, and sediment is discharged as effluent. It is a high benzene content in this effluent water stream that the present invention controls.

Desalters are typically employed in tandem arrangement to improve salt removal efficacy. Commonly, in such designs, crude oil from the resolved emulsion in the upstream, first desalter is used as crude feed to the downstream second desalter. Fresh wash water is added to the crude stream fed to the second desalter, with water phase bottoms effluent from the second desalter being fed back as makeup water, mixed with the crude fed to the first desalter.

Typical desalters are provided with heat imparting means and pressure control means. Typically, desalter temperatures are maintained at 90° to 150° C. Heat lowers the viscosity of the continuous phase (oil) thereby speeding the settlement of the coalesced water droplets as governed by Stokes law. It also increases the ability of bulk oil to dissolve certain organic emulsion stabilizers that may have been added or are naturally occurring in the crude.

Desalter pressure is kept high enough to prevent crude oil or water vaporization. Desalter pressures at operating temperatures should be about 20 psi above the crude oil or water vapor pressure, whichever is higher.

Emulsion breakers, also called the demulsifiers, are usually fed to the crude so as to modify the stabilizer film formed initially at the oil/water interface. These emulsion breakers are surfactants that migrate to the interface allowing droplets of water or oil to coalesce more readily. These demulsifiers reduce residence time required for good separation of oil and water.

Due to the advantage of heat in aiding separation, in a conventional system the crude oil fed to the first stage desalter is preheated prior to mixing with the effluent water from the second stage in feeding to the desalter unit. Thus, in a conventional two-stage desalter system both the first and second stage of the desalter train are operated at elevated temperatures.

SUMMARY OF THE INVENTION

The inventor of the present invention has found that efficacious crude oil desalting can be accomplished in a two-stage desalter system with significantly reduced benzene levels in the effluent wash water by the method of the present invention. The method of the present invention operates the first stage of a desalter system at low, e.g. ambient temperatures and reduces mixing of the wash water and raw crude prior to feeding to the first stage desalter unit. Increased amounts (over conventional systems) of demulsifier are preferably added in order to compensate for the lower temperature. The crude oil drawn off of the top of the first stage desalter is mixed with fresh wash water and heated prior to feeding to the second stage desalter unit. Mixing prior to the second stage is preferably more vigorous (than conventional systems) in order to compensate for the lighter mixing in the first stage and ensures that adequate salt removal is achieved. The second stage desalter unit is operated at high i.e., 90° to 150° C. temperature as are all prior art desalter units. The results of this new two temperature/two stage desalter system is an effluent brine which has a significantly lower benzene concentration.

DESCRIPTION OF THE PREFERRED EMBODIMENT

Figure 1:
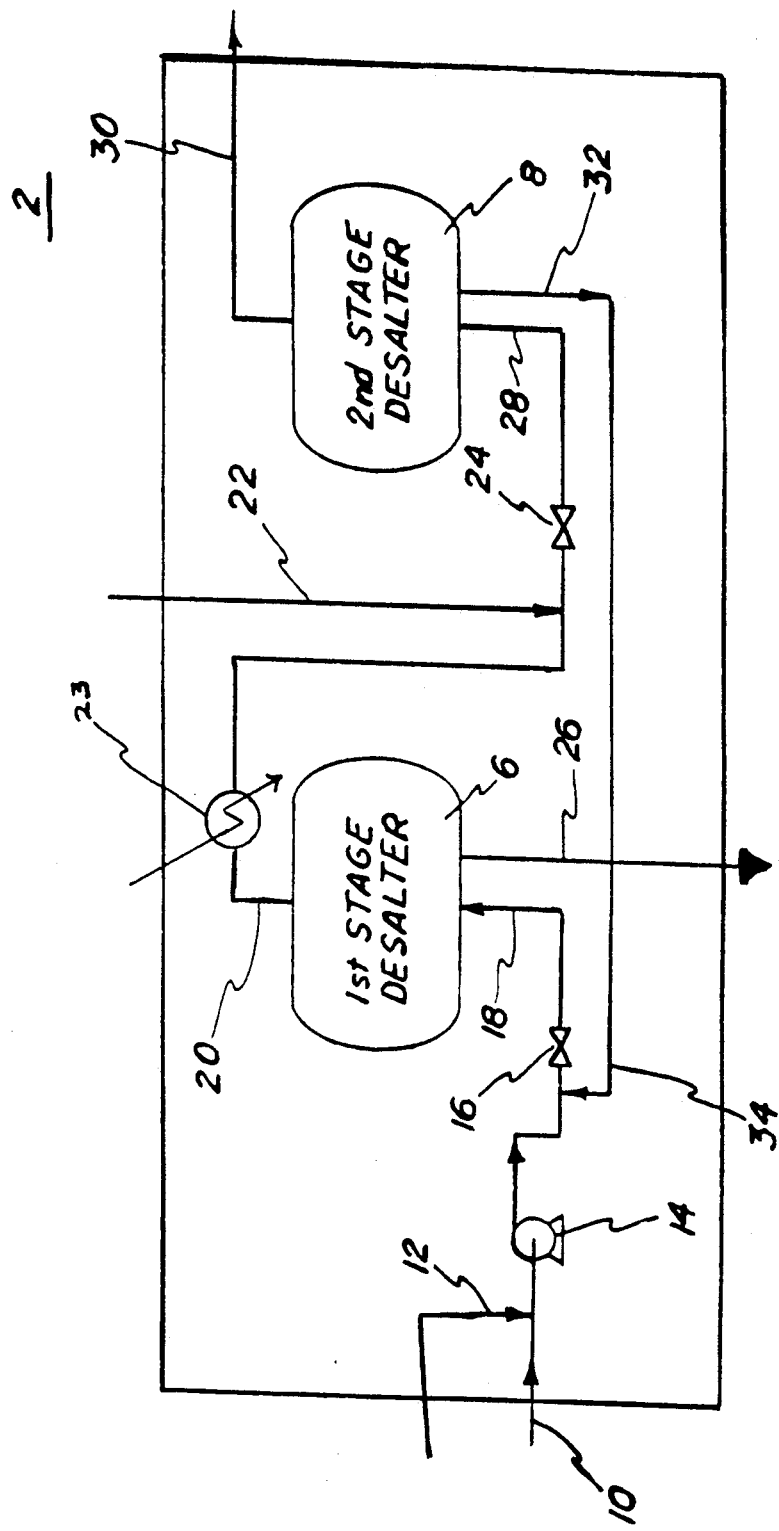
FIG. 1 is a schematic showing a two-stage desalter system in accordance with the present invention.

Turning to FIG. 1, there is shown a desalter system 2 in accordance with the present invention. The desalter system 2 contains an upstream desalter 6 and a downstream desalter 8 in tandem relationship. Desalters 6 and 8 are of the type commonly encountered in industry, such as those manufactured by Petreco or Howe - Baker.

The specific construction details of the desalters 6 and 8 are not important to the present invention. However, it is noted that ordinarily, desalters are provided with electrodes to impart an electric current through the emulsion so as to aid in coalescence of the water droplets to facilitate resolution of the emulsion. Also, desalters are typically provided with temperature and pressure control means.

Figure 2:
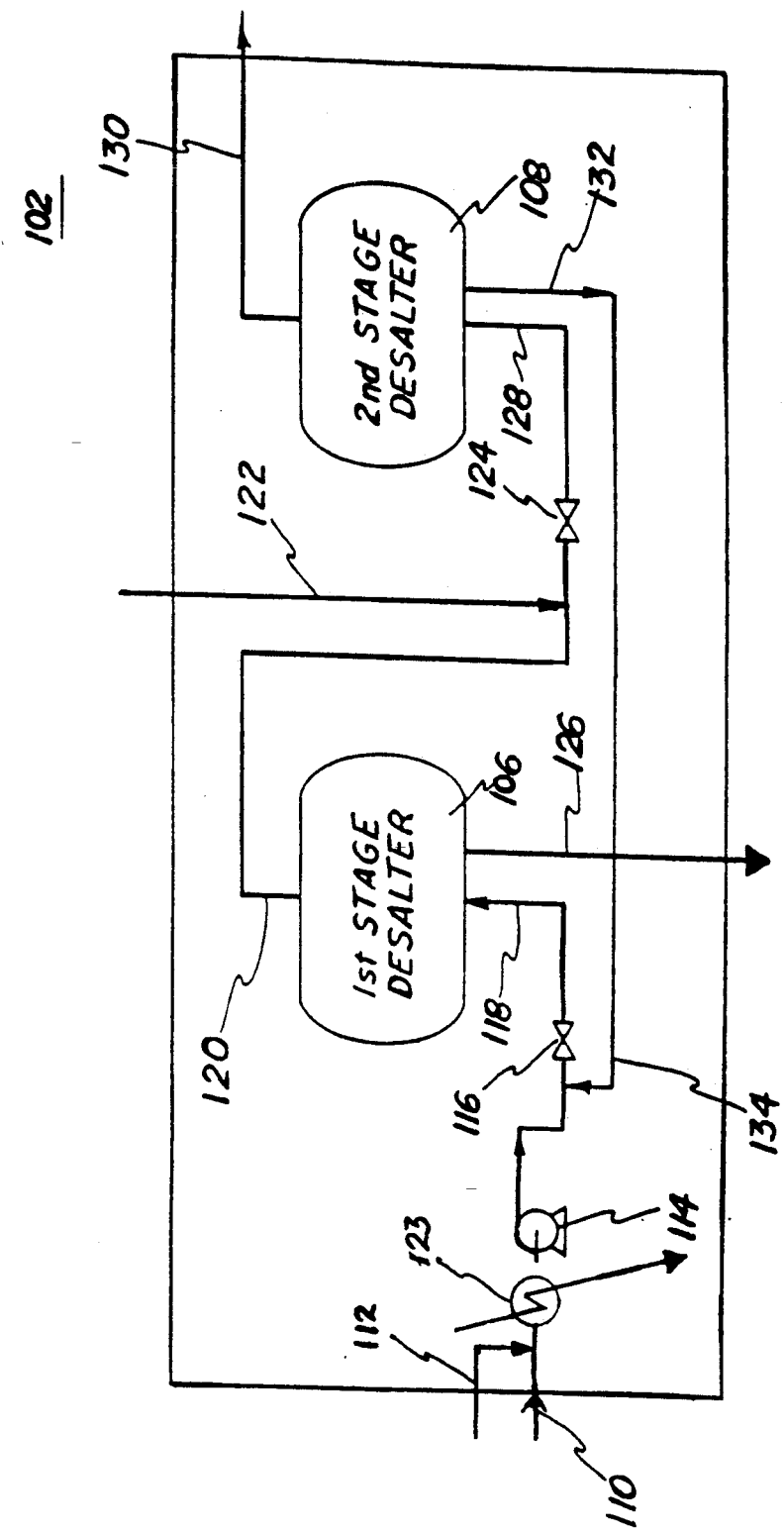
FIG. 2 is a schematic showing a prior art two-stage desalter system.

Because heat lowers the viscosity of the crude oil phase, conventional wisdom provides for heating of the crude oil feed 110 with a heat exchanger 123 (FIG. 2 shows a conventional desalter system). Reference numbers in FIG. 2 correspond to those for like parts in FIG. 1 increased by addition of 100. The heat exchanger 123 raises the temperature of the incoming crude oil stream 110 to a range of from about 90° C. to about 150° C. This elevated temperature is maintained in both the first stage desalter 106 and the second stage desalter 108.

The present inventor discovered that the present invention (as shown in FIG. 1) could significantly reduce benzene levels in the effluent brine stream 26 by placing the crude oil heater 23 in the crude oil line 20 downstream of the first stage desalter 6. Thus, the first stage desalter 6 is operated at near ambient temperatures while the second stage desalter 8 is operated at high temperatures, typically from about 90° C. to about 150° C. With the "low" temperature operation of the first stage desalter 6, the feed of emulsion breaker at line 12 is increased to improve separation within the first stage desalter 6.

Also, it is desirable to decrease the mixing effect of mix valve 16 while increasing the mixing effect of mix valve 24. These changes allow the dual temperature, two stage desalter system of the present invention to provide a desalted crude oil stream 30 comparable to a prior art process, while significantly decreasing the benzene levels in the effluent brine stream 26.

The process of the present invention employs the feed of emulsion breakers at line 12 to the raw crude feed stream 10 on the suction side of crude charge pump 14. Salt laden water effluent from the second stage desalter 8 exiting through line 32 to inlet 34 is mixed with the crude/emulsion breaker admixture at mix valve 16. The mixed brine/crude/emulsion breaker emulsion is admitted to the desalter 6 at distributor 18.

Upon resolution of the emulsion in the first stage desalter 6, separated crude is drawn off of the top of the vessel through line 20. The crude is then heated in heat exchanger 23 to a temperature of between about 90° and about 150° C. Fresh washwater is added to the crude line 20 through line 22. Water soluble adjuncts may be added to the crude line 20 via line 22 to control oily water. Thereafter, the admixture is mixed in the mix valve 24 positioned upstream of the second stage desalter 8. The hot water/crude emulsion which contains oil partitioning emulsion breakers from the first stage, is then admitted to the bottom of desalter 8, via distribution port 28.

After resolution of the emulsion in desalter 8, the effluent brine is drawn off as underflow through line 32 for the above described return as wash water to the crude/demulsifier charge at inlet 34. The desalted crude is drawn from desalter 8 via line 30 for subsequent refinery processing.

Emulsion breakers for use in the "low" temperatures of the first stage of the present invention include alkylphenol, alkylamine, alkylol, and polyol alkoxylates with or without crosslinking with aldehydes, di- or multifunctional acids, epoxides, isocyanates and the like. Alkyl groups can include t-butyl, t-amyl, di-t-butyl, tri-isopropyl, tetra-isopropyl and naturally occurring C12–C22 alkyls. Polyols include diols, triols, tetrols and sorbitols. Alkoxylation includes poly(ethylene oxide), poly(propylene oxide), poly(butylene oxide) and the like together or in blocks. It is believed that lower molecular weight, uncrosslinked versions of these materials will perform better at low temperatures.

The water soluble adjuncts added to control oily water may include the demulsifiers listed above where the alkoxylation is either a water solubilizing amount of poly(ethylene oxide) or is replaced with one or more charged groups such as sulfonate, carboxylate or ammonium. Also included are acrylic polymers with cationic, anionic and neutral charges or mixtures thereof, either on the same or separate backbones.

To show the efficacy of the present invention, the benzene concentration in effluent water from oil water mixtures at varying temperatures was measured. The benzene partition experiments were run at a 95:5 crude oil to wash water ratio. Three refinery sites with diverse crude slates were chosen as sources for the tested crude oils. The commercial emulsion breaker in use at each of the refineries was employed at the working concentrations to simulate field conditions. Kinetic testing was performed which employed a desalter mix valve simulator and desalter electric field simulator. Tests were run at varying temperatures to establish the water/oil partition coefficient for benzene.

The testing indicated that the benzene partition coefficient is independent of overall benzene concentration. The benzene levels in brine were found to increase exponentially between 38° C. and 150° C. The testing showed that this relationship was independent of crude oil or wash water source or benzene concentration. Therefore, lowering the operating temperature of the first stage desalter, and thereby the effluent brine temperature from the first stage desalter significantly reduces the benzene concentration therein. It was also found that benzene partitioning was not effected by mixing (within the ranges tested) but that salt removal was. Therefore, when mixing is decreased before the first stage in order to allow the benzene to equilibrate, mixing before the second stage should be increased to provide comparable salt removal.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. In a two-stage desalting system having an upstream and downstream desalter and wherein a crude oil/water emulsion is formed and resolved in said upstream desalter with crude separated from said upstream desalter being fed to said downstream desalter, and fresh wash water fed to said downstream desalter, a crude oil/water emulsion formed and resolved in said downstream desalter, and an effluent brine therefrom being fed to the upstream desalter as wash water, a method of decreasing the benzene concentration of an effluent brine of said upstream desalter comprising feeding crude oil to said upstream desalter at about ambient temperatures and heating the crude oil separated from said upstream desalter to from about 38° to about 150° C. prior to feeding to said downstream desalter.

2. The method of claim 1 wherein an emulsion breaker is fed to said crude oil feed to said upstream and said downstream desalters.

* * * * *